Jan. 3, 1967 R. V. RIMMER ETAL 3,296,393

ENCLOSURE WITH EXTERNAL MEANS FOR OPERATING AN ENCLOSED CIRCUIT INTERRUPTER

Filed Jan. 24, 1966 4 Sheets-Sheet 1

Jan. 3, 1967 R. V. RIMMER ET AL 3,296,393

ENCLOSURE WITH EXTERNAL MEANS FOR OPERATING AN ENCLOSED CIRCUIT INTERRUPTER

Filed Jan. 24, 1966 4 Sheets-Sheet 2

3,296,393

ENCLOSURE WITH EXTERNAL MEANS FOR OPERATING AN ENCLOSED CIRCUIT INTERRUPTER

Robert V. Rimmer, Beaver, and Louis N. Ricci, Beaver Falls, Pa., assignors to Westinghouse Electric Corporation, Pittsburgh, Pa., a corporation of Pennsylvania
Filed Jan. 24, 1966, Ser. No. 522,435
15 Claims. (Cl. 200—50)

This invention relates generally to enclosures for circuit interrupters, and more particularly to circuit-interrupter enclosures of the type comprising external operating means for operating a circuit interrupter that may be mounted within the enclosure.

The invention relates to enclosures of the type disclosed in the patents to Stephen A. Mrenna et al., Patent No. 3,213,219 and Patent No. 3,213,224, both of which patents are assigned to the assignee of the instant case.

In the art of enclosed circuit interrupters, it is desirable to have the external operating handle mounted on a fixed part of the enclosure cabinet and operatively connected to the enclosed circuit interrupter regardless of the position of the enclosure cover. Thus, the connection between the external handle and the enclosed circuit interrupter need not be disturbed during opening and closing operations of the cover.

An object of this invention is to provide an improved circuit-interrupter enclosure with improved externally operable operating means mounted on the enclosure cabinet, which operating means is adapted to be operatively connected to an enclosed circuit interrupter regardless of the position of the openable cover.

Another object of this invention is to provide an improved circuit-interrupter enclosure comprising operating means mounted on the cabinet of the enclosure which operating means comprises a pivotally supported externally operable operating handle member and a rectilinearly movable internal operating member that is operatively connected to the operating handle member to move in the same general direction as the operating handle member moves.

Another object of this invention is to provide an improved circuit-interrupter enclosure comprising operating means mounted on the enclosure cabinet and externally operable between two positions to open and close a circuit interrupter that may be mounted within the enclosure, and latch means automatically latching the enclosure cover closed in both of said positions of the operating means, which structure comprises means for unlatching the cover by operating the operating means to a third position different from the first and second positions.

Another object of this invention is to provide an improved circuit-interrupter enclosure constructed in accordance with the immediately preceding object which enclosure comprises means for defeating the latch means when the operating means is in said first and second positions.

A further object of this invention is to provide an improved circuit-interrupter enclosure comprising operating means mounted on the enclosure cabinet for operating a circuit interrupter that may be mounted within the enclosure and improved latch means mounted on the cabinet for automatically latching the operating means in the "OFF" position when the enclosure cover is moved to the open position.

A further object of this invention is to provide an improved circuit-interrupter enclosure having externally operable operating means mounted on the cabinet of the enclosure and improved latch means for latching the enclosure cover closed under certain conditions and for latching the operating means in the open or "OFF" position under certain conditions.

The invention, both as to structure and operation, together with additional objects and advantages thereof, will be best understood from the following detailed description when read in conjunction with the accompanying drawings.

Figure 1:
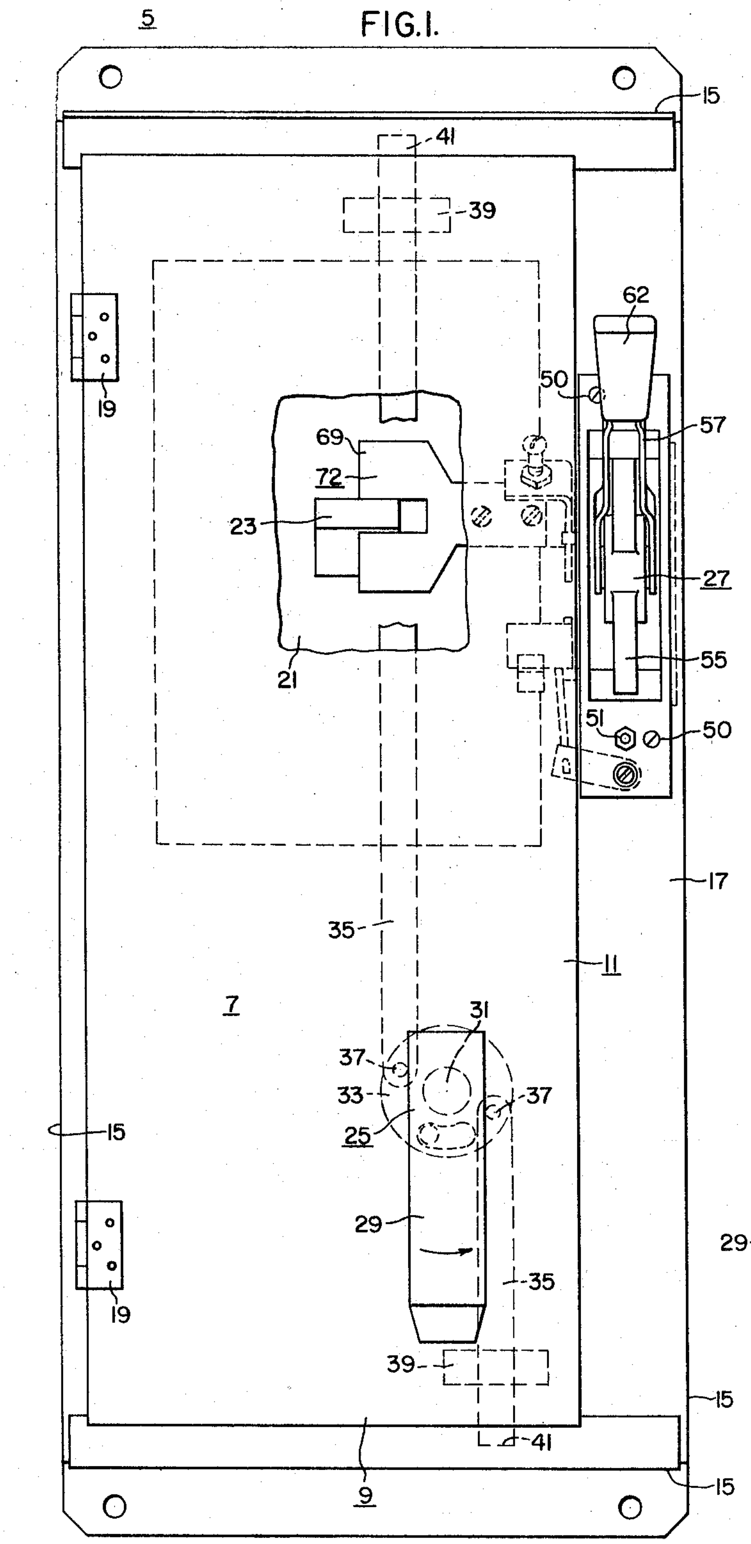
FIGURE 1 is a front elevational view, with parts broken away, of an electric control structure comprising an enclosed circuit interrupter and an improved enclosure constructed in accordance with principles of this invention.
Figure 2:
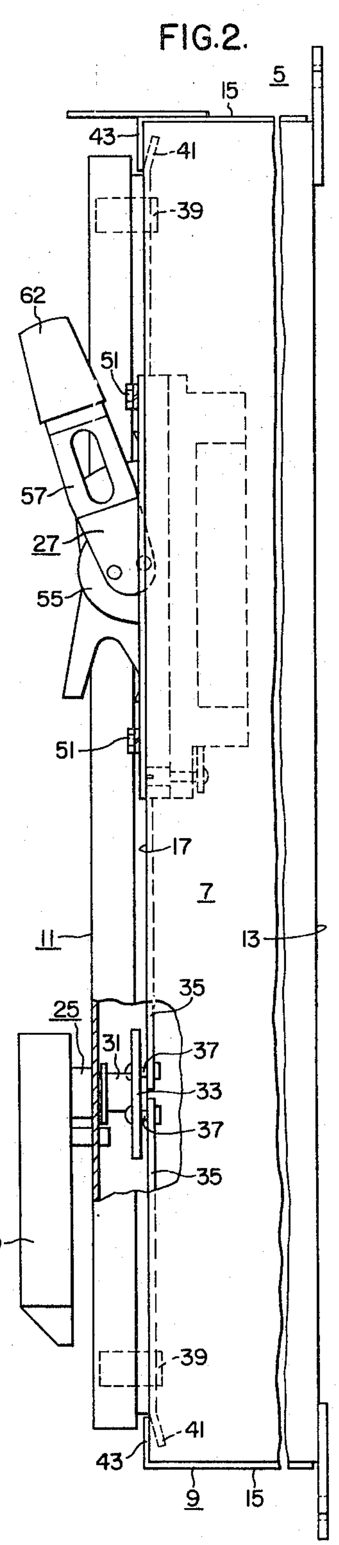
FIG. 2 is a side elevational view, with parts broken away, of the control structure seen in FIG. 1.

Referring to the drawings, there is shown in FIGS. 1 and 2, a control structure 5 comprising an enclosure 7. The enclosure 7 comprises a cabinet or receptacle 9 having an openable cover structure 11 at the front thereof. The cabinet 9 comprises a planar base 13 and four side walls 15 extending normal from the base. One of the side walls 15 is bent-over to form a fixed front portion 17 of the cabinet. The fixed front portion 17 is planar and disposed along a plane parallel to the plane of the planar base 13 and parallel to the plane of the planar front of the cover 11 when the cover is in the closed position. The cover structure 11 is pivotally supported on the front of the cabinet 9 by means of hinges 19. A circuit interrupter 21 having a handle 23 extending therefrom is suitably mounted within the cabinet 9 on the base 13. The circuit interrupter 21 may be of a number of types of circuit interrupters used to control an electric circuit. The enclosed circuit interrupter may be a switch, or it may be a circuit breaker of the general type shown, for example, in the patent to R. C. Strother et al., Patent No. 2,937,252.

The enclosure 7 comprises cover handle means 25 attached to the cover structure 11. The cover handle means 25 is operable to cam the cover structure 11 to a fully closed position. The enclosure 7 also comprises an operating and latching means 27 that is attached to the fixed front portion 17 of the receptable or cabinet 9. The operating and latching means 27 is externally operable to operate the enclosed circuit interrupter 21.

The cover handle means 25 comprises a handle 29 that is pivotally supported externally on the cover structure 11 and that is operable to rotate a pin 31 having a plate 33 rigidly secured to the inner end thereof. The handle 29 and plate 33 rotate as a unit. Two rods 35 are pivotally secured to the plate 33 on opposite sides of the pivot 31 by means of pins 37. The outer ends of the rods 35 are supported on the cover structure 11 by means of brackets 39. The rods 35 are provided with bent ends 41 (FIG. 2), which ends 41 engage ledges at opposite ends of the cabinet 9 to cam the cover structure 11 to the fully closed position when the handle 29 is rotated clockwise (FIG. 1) to the cover closing position seen in FIGS. 1 and 2. When handle 29 is rotated counterclockwise (FIG. 1) the plate 33 is rotated counterclockwise to pull the rods 35 inwardly to free the ends 41 from under the ledges 43 to permit opening of the cover structure 11.

Figure 3:
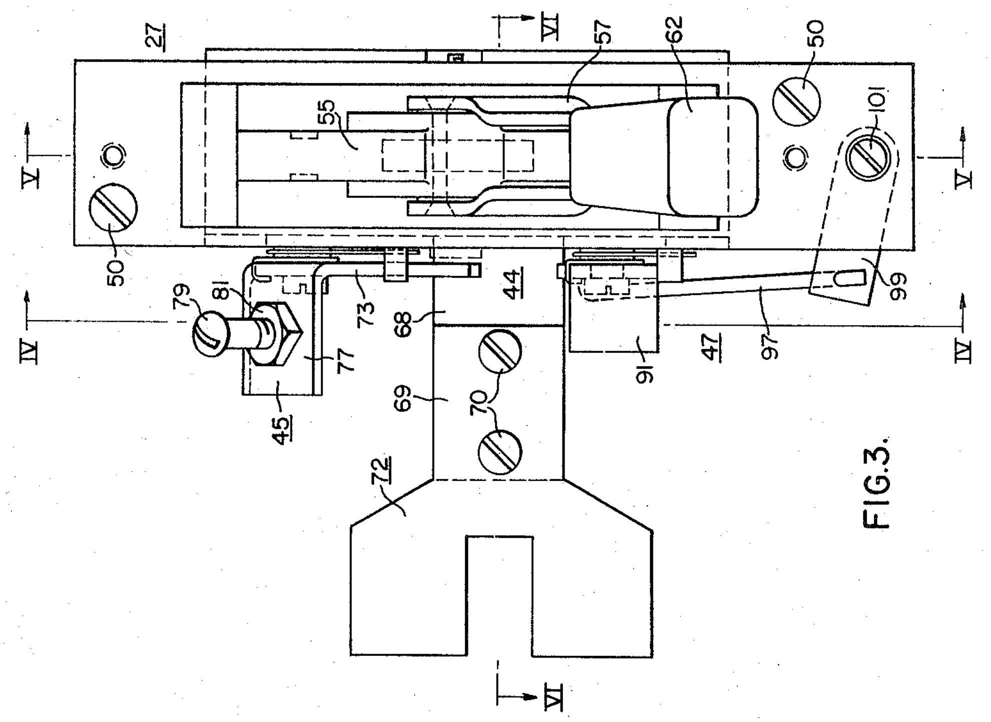
FIG. 3 is a plan view of the operating means and latching means of the enclosure of FIGS. 1 and 2.
Figure 4:
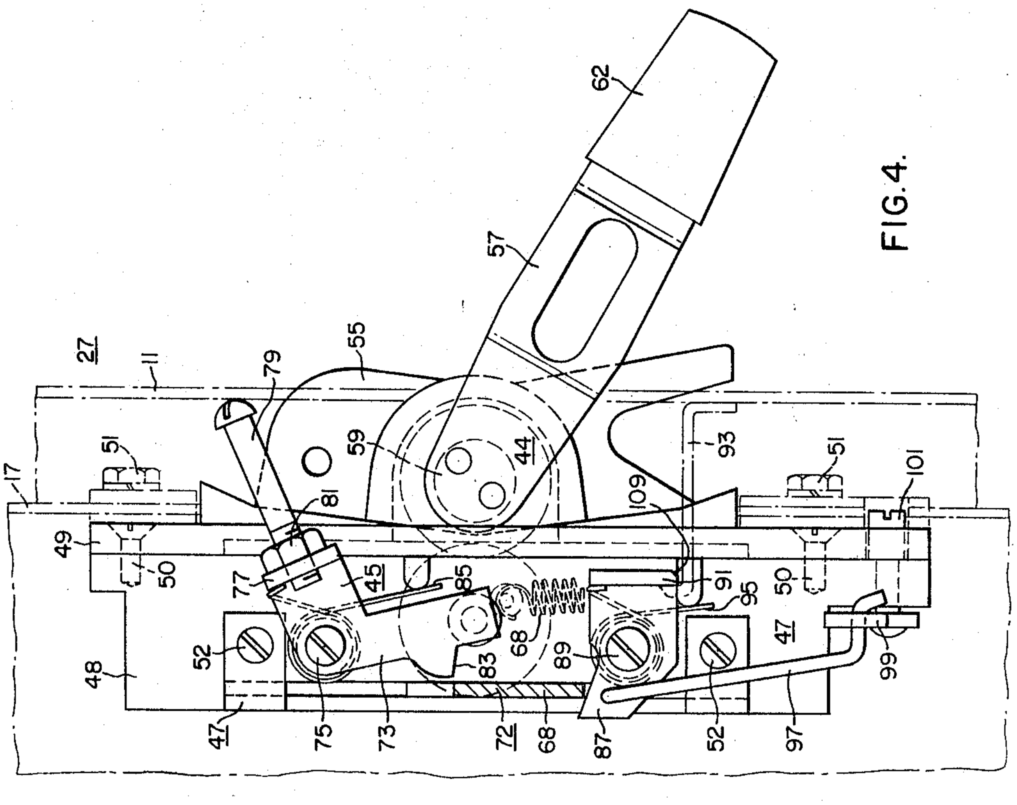
FIG. 4 is a sectional view taken generally along line IV—IV of FIG. 3 with parts of the enclosure shown in dot and dash lines.
Figure 6:
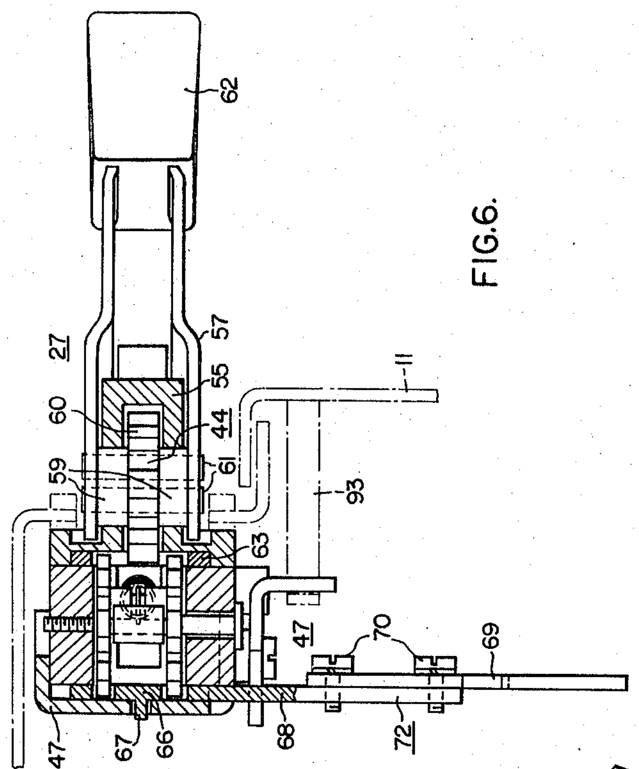
FIG. 6 is a sectional view taken generally along the line VI—VI of FIG. 3, with part of the enclosure structure shown in dot and dash lines.
Figure 5:
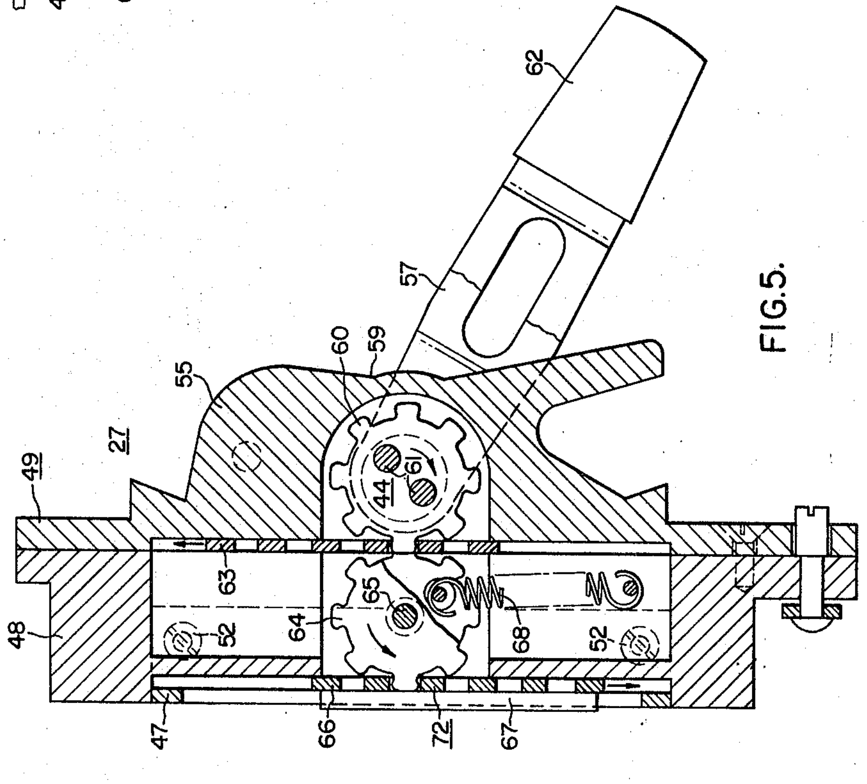
FIG. 5 is a sectional view taken generally along the line V—V of FIG. 3.

The operating and latching means 27 (FIGS. 3–6) comprises an operating means 44 and a latch structure comprising an interrupter latch structure 45 and a cover latch structure 47. The operating and latching means comprise a three-part unitary support structure comprising a lower metallic support part 47, an intermediate metallic support part 48, and an upper metallic support part 49. The parts 48 and 49 are secured together by means of two screws (FIG. 4). The support 48, 49 is secured to the fixed front portion 17 of the enclosure cabinet by means of two screws 51 (FIGS. 3 and 4). The lower support part 47 is secured to the support part 48 by four screws 52 (FIGS. 3 and 4). The screws 51 pass through suitable openings in the fixed front portion 17 of the cabinet and they are threaded into tapped openings in the support 48, 49 to fixedly secure the support 47, 48, 49 to the fixed front portion 17 of the cabinet. As can be seen in FIG. 4, the support 47, 48, 49 is positioned at an opening in the fixed front portion 17 closing off the opening. The upper part of the support part 49 is provided with an outwardly extending part 55 that is positioned along a plane that is generally normal to the plane of the fixed front portion 17 of the cabinet. An external operating handle member 57, comprising two twin members that straddle the portion 55, on a bearing 59 (FIGS. 5 and 6) that is suitably supported for rotation on the part 55 in an opening in the part 55. The handle 57 and a pinion member 60 are supported on the bearing part 59 by means of two pins 61. An insulating handle 62 is provided at the free end of the operating member 57. A first rack plate 63 (FIG. 5) is supported for rectilinear back-and-forth movement on a suitable track on the support parts 48, 49. A second and double or twin pinion 64 (FIG. 6) is pivotally supported on the support part 48 by means of a pivot pin 65. A second rack plate 66 is supported between the support parts 47, 48. A lower extension 67 on the rack plate 66 moves in a slot in the support part 47 (FIGS. 5 and 6) to guide the rack plate 66 for rectilinear back-and-forth movement upon rotation of the twin pinion 64. A spring member 68 is connected at one end to a pin on the pinion 64 (FIG. 5) and at the other end to a stationary pin on the support part 48 to bias the pinion 64 in a clockwise (FIG. 5) direction. Referring to FIG. 5, it will be noted that clockwise rotation of the external operating handle member 57 will rotate the pinion 60 in a clockwise direction to move the rack plate 63 rectilinearly in the direction of the arrow to thereby rotate the pinion 64 in a counterclockwise direction to thereby move the rack plate 66 rectilinearly in a direction that is opposite from the rectilinear direction of the rack plate 63. Movement of the handle operating member 57 counterclockwise will similarly operate the parts in the opposite direction to rotate the pinions 60, 64 in opposite directions and to move the rack plates 63, 66 rectilinearly in opposite directions. The actuating rack plate 66 will always move rectilinearly toward the end wall that the operating member 57 is pivoted toward. As can be seen in FIG. 6, the rack plate 66 comprises an extended part 68 and a connecting member or claw member 69 is secured to the part 68 by means of two screws 70. As can be seen in FIG. 1, the claw member 69 engages the operator 23 of the circuit interrupter 21 to provide an operative connection between the external handle operating member 57 and the operator 23 which connection is maintained regardless of the position of the cover structure 11 of the enclosure 9. The rack plate 66, extension 68 and claw 69 serve as an internal operating member 72.

As is best seen in FIGS. 3 and 4, the interrupter latch structure 45 comprises an interrupter latch member 73 pivotally supported on the support 48 by means of a supporting pin member 75. The interrupter latch member 73 is bent-over at one end thereof to provide a bent-over part 77, and an adjusting screw 79 is threaded into a tapped opening in the part 77. A lock nut 81 is provided to lock the adjusting screw 79 in place in the adjusted position. The latch member 73 is provided with a stop part 83 (FIG. 4) at the other end thereof. A torsion spring 85 is provided to bias the member 73 in a clockwise (FIG. 4) direction about the pivot 75.

Figure 9:
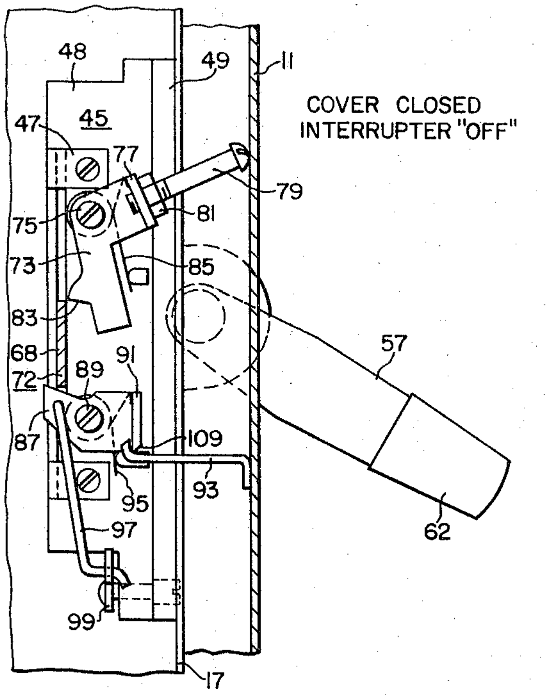
FIGS. 7–10 are partial views illustrating operating positions of certain of the parts of FIGS. 1–6.
Figure 10:
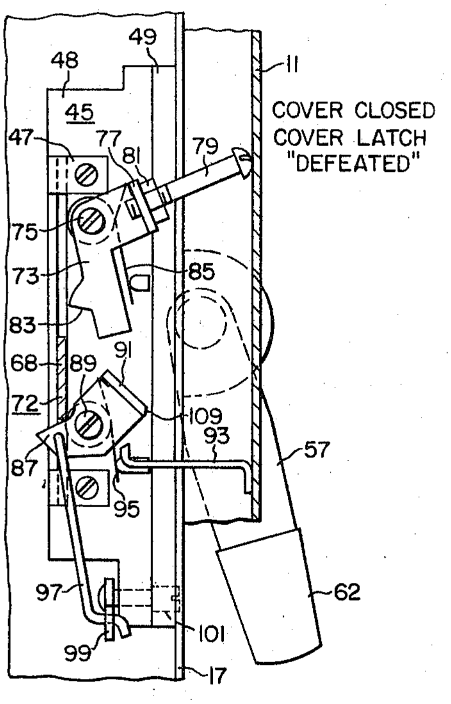
Figure 8:
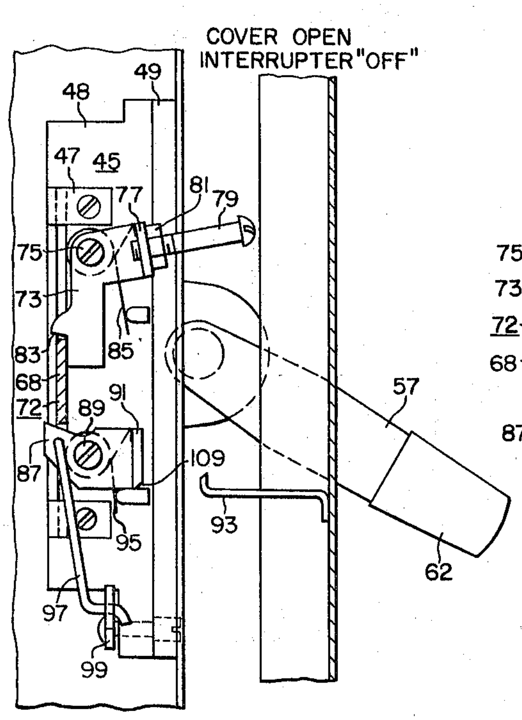

In FIG. 8 the parts are shown with the circuit interrupter in the "OFF" position and the cover in the open position. In FIG. 9 the parts are shown with the circuit interrupter in the "OFF" position and the cover in the closed position. As can be seen in FIG. 9, when the cover 11 is moved to the closed position, the cover 11 engages the adjusting screw 79 to pivot the member 73 in a counterclockwise (FIG. 9) direction to move the latch surface 83 of the member 73 clear of the internal operating member 72. Upon counterclockwise movement of the operating handle member 57 to the "ON" position (FIG. 7) the internal operating member 72 will be moved rectilinearly to the "ON" or closed position without interference from the latch part 83 of the interrupter latch member 73. Thus, with the cover 11 in the closed position the external operating member 57 can be freely operated between the "OFF" and "ON" positions to open and close the enclosed circuit interrupter 21 (FIG. 1). If the cover 11 is opened when the enclosed circuit interrupter is in the open or "OFF" position, the cover will move away from the adjusting screw 79 and the spring 85 will bias the interrupter latch member 73 in a clockwise direction to the latching position seen in FIG. 8 wherein part of the latch member 73 engages the upper surface of the internal operating member 72 to limit clockwise movement of the latch member 73. In the position seen in FIG. 8, it will be noted that the latching part 83 of the interrupter latch member 73 is disposed in the path of movement of the internal operating member 72 to prevent movement of the internal operating member 68 to the "ON" position. Thus, if an attempt is made to operate the external handle member 57 to the "ON" position with the cover 11 in the open position, the interrupter latch member 73 will prevent this operation. It will be understood that the interrupter latch can be defeated when the cover is in the open position by manually engaging the adjusting screw 79 to pivot the member 73 to the unlatching position seen in FIG. 9. If the enclosed circuit interrupter is in the closed or "ON" position when the cover is open the lower part of the latch part 83 of the latch member 73 will rest on the operating member 72. Thereafter, if the interrupter is operated to the open or "OFF" position with the cover open, the spring 85 will move the latch member 73 to the latching position seen in FIG. 8. The position of engagement of the cover 11 with the adjusting screw 79 can be adjusted by loosening the lock nut 81 and rotating the screw 79 to move the screw axially to the desired adjusted position. Thereafter, the lock nut 81 can be tightened to secure the screw 79 in the adjusted position.

Referring to FIGS. 3 and 4, the cover latch structure 47 comprises a cover latch member 87 that is pivotally supported on the support part 48 by means of a pivot pin support member 89. The latch 87 is provided with a bent-over top part 91 for cooperating with a hook member 93 (FIGS. 7–10) that is welded or otherwise fixedly secured to the cover 11. A torsion spring 95 (FIG. 4) is provided to bias the cover latch 87 to the cover latching position seen in FIG. 4. An elongated connecting member 97 is connected at one end to the cover latch 87 and at the other end to a plate 99 that is secured to a defeating member 101, which defeating member 101 is supported for rotation on the support parts 48, 49 in a suitable opening in the support parts 48, 49. The defeating member 101 is accessible for operation from outside of the enclosure (FIG. 1).

The operation of the cover latch structure 47 will be best understood with reference to FIGS. 7–10. Referring to FIG. 9, it will be seen that when the cover is closed and the circuit interrupter is "OFF" the spring 95 biases the cover latch member 87 to a latching position wherein the latch part 91 thereof engages the hook 93 to prevent opening of the cover 11. If the circuit interrupter is operated to the "ON" position from the position seen in FIG. 9, this operation will not disturb the latching relationship between the cover latch 87 and the hook 93. If it is desired to unlatch the cover latch structure 47, the external operating handle member 57 is rotated clockwise (FIGS. 9 and 10) to a third and unlatching position seen in FIG. 10. During this operation, the internal operating member 72 is moved against the cover latch member 87 to pivot the cover latch member 87 in a counterclockwise direction freeing the latch part 91 from the hook 93 so that the cover 11 can be thereafter moved to the open position. It is noted that in order to operate the cover 11 to the open position the cover handle 29 (FIGS. 1 and 2) must be rotated in a counterclockwise (FIG. 1) direction to pull to rods 35 inwardly to free the rod latch ends 41 from under the ledges 52 of the cabinet.

Figure 7:
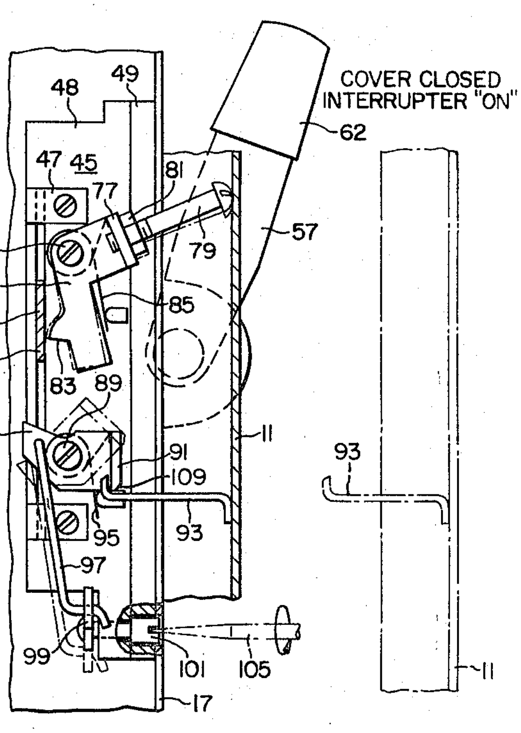

Referring to FIGS. 7 and 9, it will be noted that the cover latch 87 is in the latching position when the cover is closed and the operating handle member is in the "ON" and "OFF" positions. If it is desired to externally defeat the cover latch 87 when the cover is closed and the circuit interrupter is in either of the "ON" or "OFF" positions, a screwdriver or other similar tool 105 (FIG. 7) can be used to rotate the externally accessible defeating member 101 to rotate the plate 99 to thereby move the connecting member 97 to pull the cover latch 87 counterclockwise to the defeated unlatching position shown in dot and dash lines in FIG. 7. With the cover latch 87 in the unlatching position the operator can operate the external handle 29 (FIG. 1) in the same manner hereinbefore described to open the cover 11. When the cover 11 is in the open position and the defeating member 101 is released the torsion spring 95 will operate the cover latch 87 back to the latching position. As can be seen in FIG. 8, the latch part 91 of the cover latch 87 is provided with a cam surface 109 so that when the cover 11 is moved toward the closed position with the cover latch in the latching position the hook member 93 will engage the surface 109 and pivot the cover latch 87 in a counterclockwise direction against the bias of the spring 95 until the lower hook part of the hook member 93 clears the latch part 91 of the cover latch 87 whereupon the spring 95 will bias the cover latch 87 into the latching position to latch the cover 11 in the closed position.

It will be noted that the external operating member 57, the rack and pinion operating means 44 (FIG. 5), the interrupter latch structure 45 (FIG. 4) and the cover latch structure 47 (FIG. 4) are all supported on the support members 47, 48, 49, which support members are secured together as a unit. The support 47, 48, 49 is moved into position during the mounting operating and secured to the generally planar fixed front portion 17 (FIGS. 1 and 2) of the cabinet 7 by means of two screws 51 (FIGS. 3 and 4). Thus, an assembler of enclosures of the type herein disclosed can mount the operating and latching structures as a unit on the cabinet merely by operating two securing screws 51. The other part of the latching structure comprises merely the hook member 93 that is welded or otherwise fixedly secured to the cover 11.

From the foregoing, it will be understood that there is provided by this invention an improved control structure comprising an enclosure and a circuit interrupter mounted within the enclosure to be operated by operation of an external operating handle member. The operating means, which is mounted on a fixed front portion of the enclosure cabinet, comprises a double rack and pinion structure constructed such that upon pivotal movement of the external operating handle member the internal operating member will be moved rectilinearly toward the same end wall toward which the external operating handle member is pivoted. An improved interrupter latch structure is provided comprising an interrupter latch that is automatically pivoted as a unit about one axis to a latching position to prevent operation of the internal operating member to the "ON" position when the enclosure cover is in the open position. When the enclosure cover is closed an adjusting screw of the interrupter latch is engaged by the enclosure cover and the interrupter latch is moved against the bias of a biasing spring to the unlatching position to permit free operation of the external operating handle member.

A defeatable cover latch structure is provided comprising a cover latch member that is biased into a latching position with a hook member that is mounted on the cover. The cover latch member latches the cover closed in both the "ON" and "OFF" positions of the external operating handle member. In order to defeat the cover latch, the external operating handle member is moved to a third position past the "OFF" position in the direction from the "ON" to the "OFF" position to thereby operate the cover latch to an unlatching position whereupon an external cover handle means can be operated to open the cover. The cover latch is defeatable when the external operating member is in either the "ON" or "OFF" positions by rotation of an externally accessible defeating member that is operatively connected to the cover latch to move the cover latch to the unlatching position when the defeating member is operated to the defeating position. The operating means, circuit interrupter latch structure, and cover latch structure (except for the hook that is secured to the cover) are all mounted on a common support structure so that these parts can be connected to the cabinet merely by securing the common support structure to the cabinet with two securing screws.

With the operating means mounted on a fixed front portion of the cabinet the external operating member is operatively connected to the operator of the enclosed circuit interrupter regardless of the position of the enclosure cover. With the external operating handle member moving in a plane generally normal to the plane of the planar front of the closed cover, adequate leverage of the external operating handle is effected without having the handle extend past the front-elevational view dimensions of the enclosure, and the width dimension of the fixed front stationary part of the enclosure can be relatively small so that the enclosure opening can be relatively large.

Since numerous changes may be made in the above described construction and different embodiments of the invention can be made without departing from the spirit and scope of the invention, it is intended that all matter contained in the foregoing description or shown in the accompanying drawings shall be interpreted as illustrative and not in a limiting sense.

We claim as our invention:

1. An enclosure structure for housing a circuit interrupter of the type having an operator movable to open and close the interrupter, said enclosure structure comprising a receptacle and an openable cover for opening and closing the receptacle, said cover having a generally planar front, operating means mounted on said receptacle, said operating means comprising an internal operating member and an external operating handle member, connecting means operatively connecting said external operating handle member with said internal operating member, said internal operating member being supported for generally rectilinear movement and having a connecting part for operative connection to said circuit interrupter operator, said external operating handle member being supported for pivotal movement about an axis that extends generally parallel to said generally planar front of said cover, said external operating handle member being pivotally movable from an "OFF" position to an "ON" position in a first direction generally toward one wall of said receptable to operate said connecting means to move said internal operating member generally rectilinearly toward said one wall of said receptacle to thereby operate said circuit interrupter operator to close said circuit interrupter, and said external operating handle member being pivotally movable from said "ON" position to said "OFF" position in a second direction opposite said first direction generally toward another wall of said receptacle opposite said one wall to operate said connecting means to move said internal operating member generally rectilinearly toward said other wall of said receptacle to thereby operate said circuit interrupter operator to open said circuit interrupter.

2. An enclosure structure according to claim 1, and said connecting means comprising a double rack and pinion structure for transmitting said pivotal motion of said external operating handle member into said generally rectilinear movement of said internal operating member.

3. An enclosure structure according to claim 1, said receptacle comprising a base and side walls extending from said base and having an opening therein opposite said base, said cover being pivotally supported on said receptacle for opening and closing said opening, said receptacle having a fixed front portion adjacent said opening, said external operating handle member extending outward from said fixed front portion and being pivotally movable along a plane that is normal to the plane of the front of said cover when said cover is in the closed position.

4. An enclosure structure according to claim 3, a unitary support structure, means connecting said unitary support structure to said fixed front portion of said receptacle, said operating means being mounted on said unitary support structure, an interrupter latch supported on said unitary support structure and being operable automatically to latch said operating means against operation to the "ON" position when said cover is opened and said operating means is in the "OFF" position, a cover latch part supported on said cover, a cover latch supported on said unitary support structure, said cover latch cooperating with said cover latch part to latch said cover in the closed position when said external operating handle member is in the "ON" and "OFF" position, and said extrenal operating handle member being movable to an unlatching position different from said "ON" and "OFF" positions to move said cover latch to an unlatching position out of latching cooperation with said cover latch part to permit opening of said cover.

5. An enclosure structure for housing a circuit interrupter of the type having an operator movable to open and close the interrupter, said enclosure structure comprising a receptacle, an openable cover on said receptacle movable to open and close the receptacle, operating means supported on said receptacle, said operating means comprising an internal operating member and an external operating handle member, connecting means operatively connecting said external operating handle member with said internal operating member, a cover latch part mounted on said cover, latch means comprising a cover latch mounted on said receptacle, said cover latch being movable into and out of latching position, means biasing said cover latch into said latching position, said cover latch in said latching position cooperating with said cover latch part to latch said cover in the closed position, said external operating handle member being movable to a first position to operate said connecting means to move said internal operating member to thereby move said operator to close said circuit interrupter and said external operating handle member being movable from said first position to a second position to operate said connecting means to move said internal operating member to operate said operator to open said circuit interrupter, said external operating handle member being movable to a third position different from said first and second positions, and said operating means comprising means operating said cover latch member to an unlatching position out of said latching cooperation with said cover latch part when said external operating handle member is moved to said third position.

6. An enclosure structure according to claim 5, said first position of said external operating handle member comprising on "ON" position and said second position of said external operating handle member comprising an "OFF" position, said external operating handle member being movable in a first direction to said "ON" position and in a second direction opposite said first direction to said "OFF" position, and said external operating handle member being movable in said second direction to said third position which third position is a position past the "OFF" position in said second direction.

7. An enclosure structure according to claim 6, said external operating handle member being supported for pivotal movement to said "ON," "OFF" and third positions.

8. An enclosure structure according to claim 7, said internal operating member being supported for rectilinear movement, said connecting means comprising a double rack and pinion connecting structure converting said pivotal movement of said external operating handle member to rectilinear movement of said internal operating member in the same general direction as the pivotal movement of said external operating handle member, and upon movement of said external operating handle member to said third position, said internal operating member engaging said cover latch member to move said cover latch member to said unlatching position.

9. An enclosure structure according to claim 8, and an externally accessible defeating means operable when said external operating handle member is in said "ON" and "OFF" positions to move said cover latch member to said unlatching position.

10. An enclosure structure according to claim 6, an interrupter latch supported on said receptacle, spring means biasing said interrupter latch toward a latching position, said cover in the closed position engaging said interrupter latch to maintain said interrupter latch in an unlatching position against the bias of said spring means, and upon opening of said cover said interrupter latch being automatically released whereupon said spring means operates said interrupter latch to a latching position latching said operating means to prevent movement of said external operating handle member from said "OFF" to said "ON" position when said cover is opened with said circuit interrupter in the open position.

11. An enclosure structure according to claim 5, said cover having a generally planar front, said receptacle having a fixed front portion, said operating means being mounted on said fixed front portion, and said external operating handle member being supported for pivotal movement along a plane generally normal to the plane of said planar front of said cover when said cover is in the closed position.

12. An enclosure for housing a circuit interrupter of the type having an operator movable to open and close the interrupter, said enclosure comprising a receptacle and an openable cover for opening and closing the receptacle, operating means mounted on said receptacle, said operating means comprising an internal operating member and an external operating handle member, connecting means connecting said external operating handle member with said internal operating member, an interrupter latch structure mounted on said receptacle for pivotal movement as a unit about a single axis, means biasing said interrupter latch structure toward a latching position, said cover in the closed position engaging said interrupter latch structure to maintain said interupter latch structure in an unlatching position against the bias of said biasing means, and when said cover is opened with said circuit interrupter open said biasing means moving said interrupter latch structure about said axis to a latching position, said interrupter latch structure in the latching position latching said operating means to prevent an operation of said operating means that would close said circuit interrupter.

13. An enclosure according to claim 12, said receptacle comprising a planar base and side walls extending from said base, said receptacle having an opening opposite said base, said openable cover being pivotally mounted on said receptacle to open and close said opening, said receptacle comprising a planar fixed front portion parallel to said base and adjacent said opening, said operating means being mounted on said fixed front portion.

14. An enclosure structure according to claim 12, said interrupter latch structure comprising a first part having a tapped opening therein and a second part, said second part comprising a threaded portion threaded into said tapped opening, said second part being engaged by said cover in the closed position to maintain said interrupter latch structure in the unlatching position, and said second part being rotatable to adjust the position of engagement of said second part with said cover.

15. An enclosure structure according to claim 13, said external operating handle member being pivotally movable along a plane generally normal to the plane of said planar fixed front portion, said internal operating member being supported for generally rectilinear movement, said connecting means comprising a double rack and pinion type connecting means converting said pivotal movement of said external operating handle member to rectilinear movement of said internal operating member in the same general direction as the direction of pivotal movement of said external operating handle member, and said interrupter latch in said latching position engaging said internal operating handle member to prevent an operation of said operating means that would close said circuit interrupter.

No references cited.

ROBERT K. SCHAEFER, *Primary Examiner.*

J. R. SCOTT, *Assistant Examiner.*